Jan. 14, 1969 R. E. FRITTS 3,422,356
FEEDBACK COMPRESSOR CIRCUIT TO CONTROL MAXIMUM PERCENTAGE MODULATION
Filed June 3, 1965
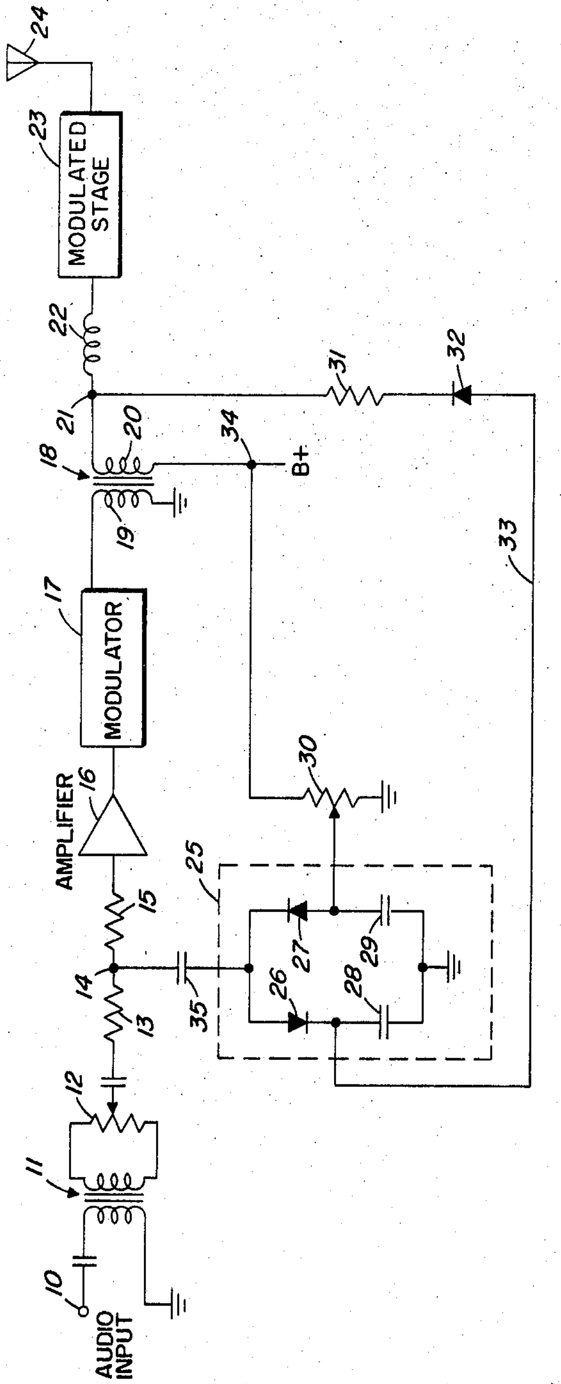
INVENTOR.
REX E. FRITTS
BY
ATTORNEYS 3,422,356

FEEDBACK COMPRESSOR CIRCUIT TO CONTROL MAXIMUM PERCENTAGE MODULATION

Rex E. Fritts, Hiawatha, Iowa, assignor to Collins Radio Company, Cedar Rapids, Iowa, a corporation of Iowa Filed June 3, 1965, Ser. No. 461,019

U.S. Cl. 325—159 5 Claims

Int. Cl. H04b 1/04

ABSTRACT OF THE DISCLOSURE

The invention describes a system for controlling the modulation of a radio transmitter. When modulating an R.F. signal a bias voltage is varied at an audio rate around a fixed voltage. Because the percent modulation is proportional to the bias voltage excursion the percent modulation can be controlled by sampling the positive and negative half-cycles of the input and comparing the half-cycles to an adjustable reference voltage. By applying the results of the comparison to a compressor circuit the percent modulation can be limited to any value over a wide variation of input levels. The compressor circuit consists of a pair of parallel connected, oppositely poled, diodes. One diode receives the output of the amplifier and the other diode receives an adjustable biasing voltage. The output of the compressor circuit is fed to the input of the amplifier so that the gain of the amplifier is controlled by the feedback through the compressor circuit. The feedback signal is controlled by varying the biasing voltage input to the compressor circuit.

This invention relates generally to a modulation control device and particularly to a system for controlling the percentage of modulation of an amplitude modulation transmitter by a predetermined value.

In prior art systems for controlling the modulation of a ratio transmitter the usual practice is to sense the maximum value of the modulating signal and to control modulation when this maximum value exceeds a predetermined level. These systems prevent over modulation caused by an excessive amplitude but do not prevent the envelope of the modulated wave from going to zero. In order to best control modulation it is desirable to prevent the modulated wave envelope from going to zero. This is so because the modulated stage is cut off when the instantaneous voltage across it is zero. At the instant of cut off, and also when being cut back on, objectionable splatter is created. Any system which allows the modulated envelope to go to zero inherently suffers splatter, which distorts the audio signal.

When modulating an R.F. signal a bias voltage is varied at an audio rate around a fixed voltage. Because the percent modulation is proportional to the bias voltage excursion the percent modulation can be controlled by sampling the positive and negative half-cycles of the input and comparing the half-cycles to an adjustable reference voltage. By applying the results of the comparison to a compressor circuit the percent modulation can be limited to any value over a wide variation of input levels.

It is therefore an object of this invention to overcome these disadvantages by sensing a minimum level for the negative half-cycle and thereby eliminate the disadvantage of splatter and distortion caused by control of the maximum amplitudes.

It is another object of this invention to provide a system which controls the percentage of modulation by sensing the minimum level of the negative half-cycle.

It is another object of this invention to provide such a system with a compressor circuit which enables the percentage of modulation to be controlled for both the positive and negative half-cycles.

It is another object of this invention to provide such a system by which the percentage of modulation can be controlled to within a predetermined percentage.

Another object is to provide such a system in which the percentage of variation can be varied by the adjustment of a single variable resistor to any desired percentage.

Further objects, features, and advantages of the invention will become apparent from the following description and claims when read in view of the accompanying drawing, in which the figure shows a well-known AM transmitter in conjunction with the inventive control system.

Referring now to the figure which shows, in simplified form, a well-known AM transmitter wherein an audio input is applied to an input terminal 10. This input is transformed through transformer 11 and fed to a volume control 12. The output of the volume control 12 is fed to a voltage dividing network 13, 14, and 15 to serve as the input to audio amplifier 16. The output of audio amplifier 16 is fed through modulator 17, the output of which is fed through modulator transformer 18 to an R.F. choke 22 and on to a modulated stage 23. Modulator transformer 18 has a primary 19 one side of which is grounded and a secondary 20 one side of which is connected to a bias voltage at junction 34. Junction 14 of resistors 13 and 15 is connected through a capacitor 35 to a compressor circuit 25. A rheostat 30 connects compressor circuit 25 to the B+ supply. The other side of compressor 25 is connected via line 33 through diode 32 and resistor 31 to the input side of R.F. choke 22. As shown in the figure, compressor 25 is composed of oppositely poled identical diodes 26 and 27. These diodes are respectively connected to ground through capacitors 28 and 29.

In operation, an audio input at terminal 10 is amplified by amplifier 16 and modulator 17, and modulates the modulated stage 23. The modulated signal is ultimately passed to antenna 24 where it is transmitted through free space to a receiving antenna. The inventive circuit controls the percentage of modulation of the transmitted signal in the following manner:

A predetermined positive voltage is applied to diode 27. This positive voltage can be varied to any selected value by use of rheostat 30. Alternatively, if the percentage of modulation desired is a fixed value, rheostat 30 can be replaced by fixed resistors. Diode 26 is connected through current limiting resistor 31 and diode 32 to junction 21 at the input end of choke 22. Diode 32 is poled to block positive voltages from being applied to diode 26. When the voltages applied to diodes 26 and 27 are sufficient to render the diodes conductive audio signals at junction 14 pass through the diodes to ground. This has the effect of attenuating the signals by an amount determined by the ratio of resistors 13 and 15.

Because a positive voltage is applied to diode 27 by rheostat 30, the diodes 26 and 27 will be non-conducting until the voltage at junction 21 falls below a value sufficient to render diode 32 conductive. This voltage is below the positive voltage applied to diode 27. As the voltage on line 33 falls below the applied voltage to diode 27, diodes 26 and 27 conduct and the audio signal at junction 14 is attenuated. The time constant of C28 and C29 is sufficient that both the positive and negative half cycles of the audio signal are attenuated. The attenuation of the audio signal has the same effect as decreasing the gain of amplifier 16 and therefore the percentage of modulation is prohibited from rising above a predetermined value. This predetermined value is readily varied by varying the voltage applied to diode 27 by rheostat 30. When the audio input to amplifier 16 returns to its normal level, diodes 26 and 27 will again cut off and the transmitter acts in its normal manner.

It should be noted that this circuit can also be used to sense the maximum half-cycle levels simply by reversing the polarity of diodes 26 and 27. This would result in an operation similar to that of the prior art systems described hereinabove.

Although this invention has been described with respect to a particular embodiment thereof, it is not to be so limited, as changes and modifications may be made therein which are within the spirit and scope of the invention as defined by the appended claims.

I claim:

1. A modulation control system for a transmitter having an amplifier and a modulator transformer comprising; compressor means for selectively attenuating the input to said amplifier, said compressor having voltage sensitive switching means, voltage means for applying a positive voltage to a first input of said switching means, and voltage varying means for varying the voltage supplied to said first input of said compressor means, means for applying the output of said modulator transformer to a second input of said switching means, so that the gain of said amplifier is selectively controlled through said compressor by selective adjustment of said voltage varying source.

2. The control system of claim 1 wherein said voltage sensitive switching means consists of oppositely poled diodes connected in parallel.

3. The control system of claim 2 including a capacitor in series with each of said diodes.

4. The control system of claim 3 wherein said voltage varying means is connected to the junction of one of said diodes and one of said capacitors, and wherein a third diode is connected between said modulator transformer and the junction of the other of said diodes and the other of said capacitors.

5. A modulation control system for a transmitter, the input to the amplifier of said transmitter being supplied to a voltage dividing means, said transmitter having a modulator transformer, said control system comprising a pair of parallel paths connected to said dividing means, each of said paths having a diode and a capacitor connected in series, said diodes being oppositely poled with respect to said dividing means, variable means for applying a voltage to one of said parallel paths, a third diode connected between the other of said parallel paths and the secondary of said transformer so that the modulation of said transmitter is controlled by varying the gain of said amplifier through said parallel paths.

References Cited

UNITED STATES PATENTS

| | | | |
|---|---|---|---|
| 2,325,366 | 7/1943 | Brown | 332—38 |
| 2,474,103 | 6/1949 | Graham | 332—38 |
| 2,877,424 | 3/1959 | Ross | 332—38 |
| 2,906,970 | 9/1959 | Wylde | 332—38 |
| 3,277,384 | 10/1966 | Longhlin | 325—347 X |
| 3,332,017 | 7/1967 | Dennis | 325—144 X |

RALPH D. BLAKESLEE, *Primary Examiner.*

U.S. Cl. X.R.

325—144, 181, 187, 347; 330—138, 140; 332—38; 333—14